United States Patent [19]

Strobl et al.

[11] Patent Number: 5,006,742

[45] Date of Patent: Apr. 9, 1991

[54] SPLASHPROOF COVER FOR AN ELECTRIC MOTOR

[75] Inventors: Georg Strobl, Repulse Bay; Ben T. Wong, Wah Fu, both of Hong Kong

[73] Assignee: Johnson Electric S.A., La Chaux de Fonds, Switzerland

[21] Appl. No.: 410,066

[22] Filed: Sep. 21, 1989

[30] Foreign Application Priority Data

Sep. 22, 1988 [GB] United Kingdom ............... 8822321

[51] Int. Cl.$^5$ .............................................. H02K 5/10
[52] U.S. Cl. ......................................... 310/88; 310/43; 310/71; 310/89
[58] Field of Search ................ 310/89, 91, 88, 77, 310/71, 40 MM, 43, 208

[56] References Cited

U.S. PATENT DOCUMENTS

| | | | |
|---|---|---|---|
| 3,631,275 | 12/1971 | Conrad | 310/71 |
| 4,518,886 | 5/1985 | Kaneyuki | 310/71 |
| 4,707,627 | 11/1987 | Best | 310/71 |
| 4,853,576 | 8/1989 | Mayumi | 310/71 |

FOREIGN PATENT DOCUMENTS

| | | | |
|---|---|---|---|
| 0191982 | 9/1957 | Austria | 310/71 |
| 1121198 | 1/1962 | Fed. Rep. of Germany | 310/71 |
| 2155811 | 5/1973 | Fed. Rep. of Germany | 310/71 |
| 0198548 | 8/1988 | Japan | 310/71 |
| 1012392 | 4/1983 | U.S.S.R. | 310/71 |
| 507622 | 9/1939 | United Kingdom . | |

*Primary Examiner*—R. Skudy
*Attorney, Agent, or Firm*—Fleit, Jacobson, Cohn, Price, Holman & Stern

[57] ABSTRACT

A splashproof cover 7 for an electric motor comprises a plastics body 8 having a socket 15 molded thereon for connection to a power supply. Two conductors 17 are molded in the body 8 and each comprises a terminal 16 and a body part 18 from which a tongue 20 projects. The tongues 20 are received in slots 6 in the motor end cap 3 to secure the cover thereon. Slots 19 in the body part receive the motor terminals 5. A skirt 9 on the body 8 surrounds the periphery 10 of the end cap 3.

4 Claims, 2 Drawing Sheets

SPLASHPROOF COVER FOR AN ELECTRIC MOTOR

The present invention relates to a splashproof cover for an electric motor, in particular for a fractional horsepower permanent magnet direct current motor, and to a motor having such a cover.

Small PMDC motors used in automobiles may be exposed to water. To ensure efficient motor operation, a waterproof or splashproof sleeve can be put on the can-like motor casing. However, it is not easy to cover the motor end cap due to the presence of the terminals. Different automobile manufacturers require different terminal configurations, which obliges the motor manufacturer to provide different end caps.

The present invention aims to provide a system for splashproofing a motor end cap, and at the same time allowing a single end cap configuration to be adapted to suit the requirements of different automobile manufacturers.

The present invention provides a splashproof cover for an end cap of a motor housing, the motor end cap carrying a motor terminal, the cover comprising mounting means for mounting the cover on the housing, sealing means for forming a splashproof seal with the housing, connector means for connection to a power supply, and contact means for electrically connecting the motor terminal to the connector means.

Very preferably the cover comprises an integrally formed conductor which has a first projection which is receivable in an aperture in the end cap to locate the cover, an aperture or slot for receiving the motor terminal to make electrical contact therewith, and a second projection forming a terminal of the connector means.

Other, preferred, features and advantages of the invention will be apparent from the following description and the accompanying claims.

The invention will be further described, by way of example only, by reference to the accompanying drawings, in which.

Figure 1:
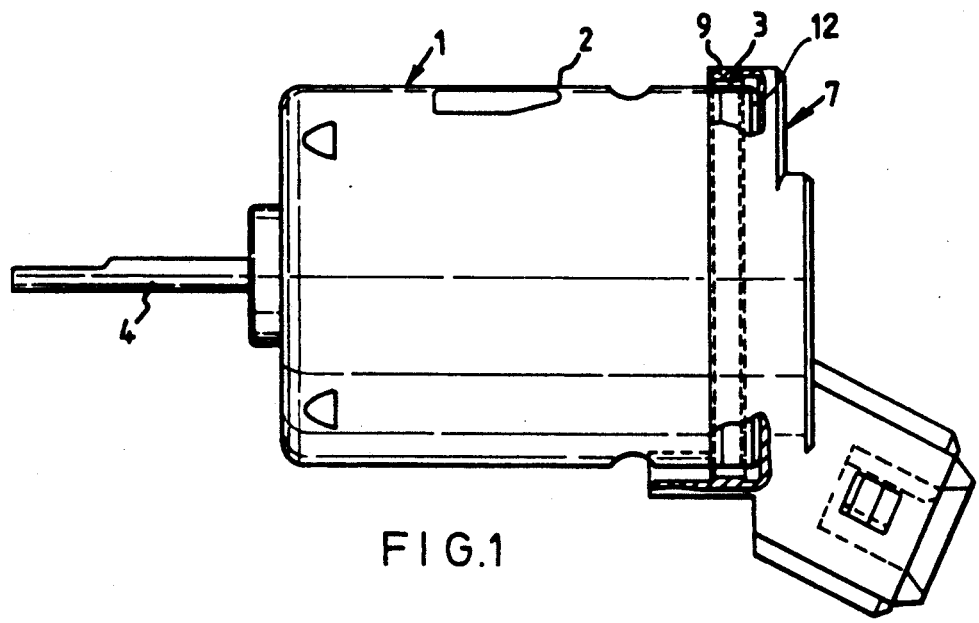
FIG. 1 is a side view of a fractional horsepower PMDC motor having thereon an embodiment of a cover according to the present invention.
Figure 2:
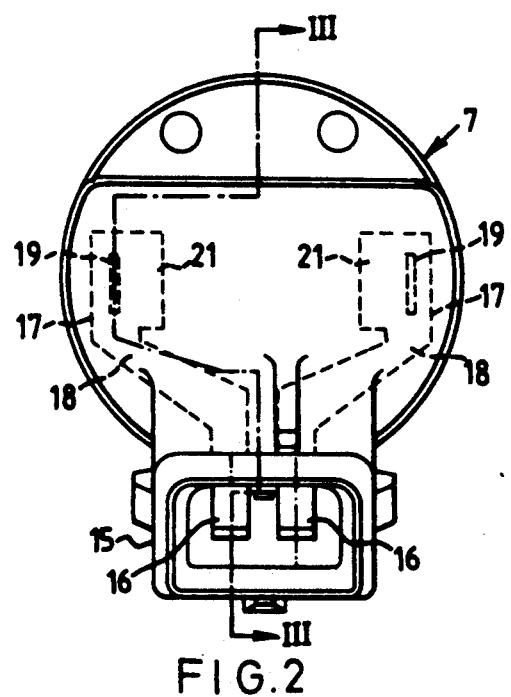
FIG. 2 is a plan view of the outside of the cover of FIG. 1.
Figure 3:
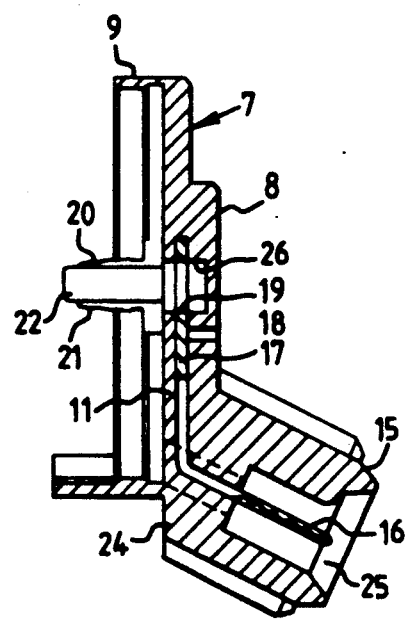
FIG. 3 is a cross-section along the line III—III of FIG. 2.
Figure 4:
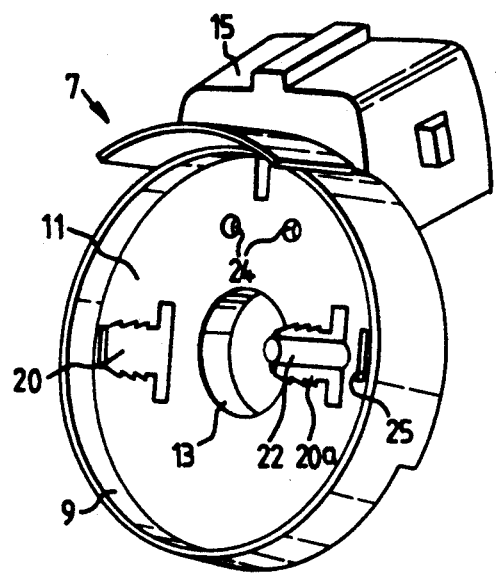
FIG. 4 is a perspective view from underneath of the end cap of FIG. 1.
Figure 5:
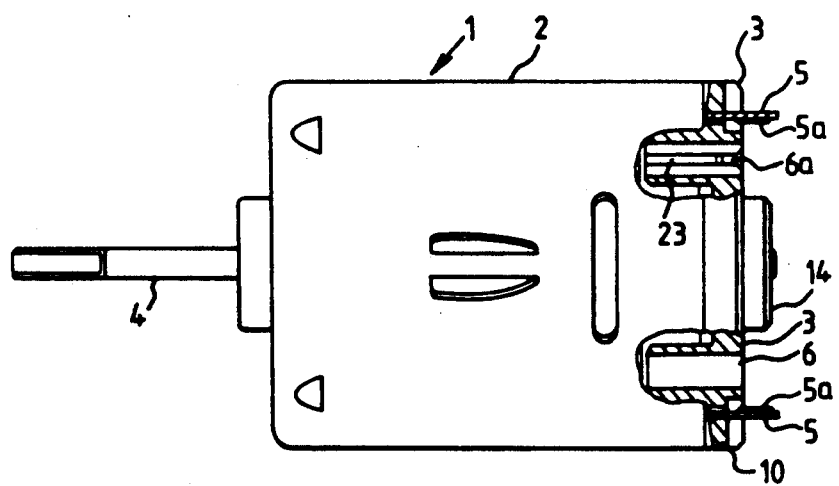
FIG. 5 is a plan view of the motor of FIG. 1, partly cut away.

Referring to the drawings, FIGS. 1 and 5 show a fractional horsepower PMDC motor 1 having a housing comprising a deep-drawn can-like steel casing 2 and a plastics end cap 3. A shaft 4 is journalled in bearings in the casing 2 and end cap 3. The shaft 4 carries a wound armature and commutator (not shown) and the casing 2 carries two permanent magnets (not shown). The end cap 3 carries brushgear (not shown) and two motor terminals 5 electrically connected to the brushgear for supplying power thereto. The construction thus far described is well known in the art.

The end cap 3 also has two slots 6 whose purpose will become apparent hereinafter.

Referring to FIG. 1, a splashproof cover 7 of the invention is mounted on the motor 1. The cover 7 comprises a moulded plastics body 8 having a peripheral skirt 9 which encircles the outer periphery 10 of the end cap 3. An inner surface 11 of body 8 bears against the outer surface 12 of the end cap 3 and has a recess 13 for receiving a boss 14 on the end cap, which carries the shaft bearing (not shown). A socket 15 housing two connector terminals 16 is integrally formed on the body 8.

Two conductors 17 are insert moulded in the cover 7. The conductors each comprise a planar body part 18 encased by the body 8. The terminals 16 are integral with the body parts 18 and extend out of the plane of the respective body parts 18 into the socket 15. A slot 19 is formed in each body part 18 to receive a respective terminal 5 to make electrical contact therewith. Apertures 26 are provided in the inner surface 11 in line with the slots 19 and extend beyond the slots into the body 8 to accomodate the terminals 5. The terminals 5 have a rib 5a for forming a tight fit in the slots 19. A tongue 20 extends from an edge 21 of each body part 18 on the underside of the body 8. The tongues 20 have sawtooth edges 21 and are arranged to grip sides of the slots 6 in the end cap 3. Ribs 22 of plastics extend down the sides of one of the tongues 20a in order to distinguish between the tongues.

Corresponding grooves 23 are provided in the walls of one walls of one of the slots 6a to receive the ribs 22.

Two drain holes 24 extend from the inner surface 11 of the body 8 into recess 25 in the socket 15.

The motor end cap 3 is of standard configuration and may have vent holes or hollow rivets therein through which water can enter the motor. The motor is usable without the cover 7, electrical connection being made to the terminals 5 in the usual way. However the slots 6 are provided to enable the cover 7 to be fitted. In use, the cover 7 is slid over the end cap 3, the terminals 5 penetrating the slots 19, and the tongues 20 entering the slots 6, the sawtooth edges 21 gripping the slots to hold the cover on the end cap. The ribs 22 ensure that the cover will fit on the end cap only one way, to avoid reversing the polarity of the motor. The inner surface 11 bears against the end cap to cover any vent holes or other apertures in the end cap. A power supply may then be connected to the socket 15 to supply power to the motor brushgear via terminals 16, body part 18 and terminals 5. The drain holes 24 are arranged to cooperate with holes through the end cap 3 so that any water which does accumulate in the motor may drain away (when the motor is installed end cap down).

A sleeve (not shown) may enclose the casing 2 and mate with the skirt 9 to cover vent holes etc. in the casing 2.

The connector 15 may be of various shapes to suit the automobile manufacturers requirements, whilst the configuration of the end cap 3 may remain constant, thus allowing a standard motor to be developed to suit the various manufacturers connection requirements.

By forming a tongue 20 and respective slot 19 on a common body part 18 the stability of the cover and security of the electrical connection is enhanced.

The skirt 9 may be a snug fit about the periphery 10 of the end cap to inhibit the ingress of water between the cover and end cap. Also, the skirt may extend down the side of the motor, over the casing 2.

Various modifications may be made to the described embodiment and it is desired to include all such modifications as fall within the scope of the accompanying claims.

What is claimed is:

1. A splashproof cover for a slotted end cap of a motor having a pair of motor terminals protruding through the end cap, the cover comprising:

a generally circular solid molded plastic planar body integrally formed with a socket at one side of the body, tongues extending transversely to the plane of the body for entering into the slots of the end cap, apertures in the body for receiving the motor terminals, and conductors insert molded within the body and extending along the plane of the body from each aperture to inside the socket.

2. A splashproof cover according to claim 1 wherein the cover is integrally formed with a peripheral skirt encircling an outer periphery of the end cap.

3. A splashproof cover in combination with a slotted end cap of a motor having a pair of motor terminals protruding through the end cap, the cover comprising:

a generally circular solid molded plastic planar body integrally formed with a socket at one side of the body, tongues extending transversely to the plane of the body, the tongues being inserted into the slots of the end cap, apertures in the body receiving the motor terminals, and conductors insert molded within the body extending along the plane of the body from each aperture to inside the socket.

4. A splashproof cover according to claim 3 wherein the cover is integrally formed with a peripheral skirt encircling an outer periphery of the end cap.

* * * * *